United States Patent [19]

Anders et al.

[11] Patent Number: 4,568,459
[45] Date of Patent: Feb. 4, 1986

[54] FILTERING DEVICE

[75] Inventors: Dietmar Anders, Hanover; Georg Reisswig, Equord, both of Fed. Rep. of Germany

[73] Assignee: Hermann Berstorff Maschinenbau GmbH, Hannover, Fed. Rep. of Germany

[21] Appl. No.: 666,456

[22] Filed: Oct. 30, 1984

[30] Foreign Application Priority Data

Nov. 3, 1983 [DE] Fed. Rep. of Germany ....... 3339737

[51] Int. Cl.⁴ .................................... B01D 33/06
[52] U.S. Cl. ............................. 210/333.1; 210/326; 210/334; 210/402
[58] Field of Search .............. 210/333.1, 334, 413, 210/414, 326, 402

[56] References Cited

U.S. PATENT DOCUMENTS

| 336,425 | 2/1886 | Ockershausen | 210/413 X |
| 3,984,317 | 10/1976 | Donovan | 210/334 X |
| 4,052,305 | 10/1977 | Arvanitakis | 210/413 X |

FOREIGN PATENT DOCUMENTS

| 2407663 | 9/1974 | Fed. Rep. of Germany | 210/333.1 |
| 2025249 | 1/1980 | United Kingdom | 210/414 |

*Primary Examiner*—Richard L. Chiesa
*Attorney, Agent, or Firm*—Schwartz, Jeffery, Schwaab, Mack, Blumenthal & Evans

[57] ABSTRACT

A filtering device for filtering solids from liquids or liquid-like materials comprising a housing within which a filter member is rotatably mounted. The filter member which is traversed radially by the material to be filtered, comprises an outer sleeve member, a fine filter sleeve, a support filter sleeve and an inner sleeve member or drum. The outer sleeve member includes bores which receive the material to be filtered and has an external surface which is cylindrical. The filtrate, that is to say, the liquid or liquid-like material, passes through the filter member into the interior of the drum and then travels axially along the drum to a discharge outlet. At least the fine filter sleeve and the support filter sleeve taper conically inwardly in a direction towards the outlet. The solid material remains in the bores. As the filter member rotates, these bores become aligned with back-rinsing bores of conduits formed in the housing and the solid material is forced into such conduits by the back-pressure set up by the liquid material in the filter member. The conduits are closable by means of slidably displaceable pistons located therein, the pistons and conduits having sealing means which co-operate in one position of the pistons.

7 Claims, 2 Drawing Figures

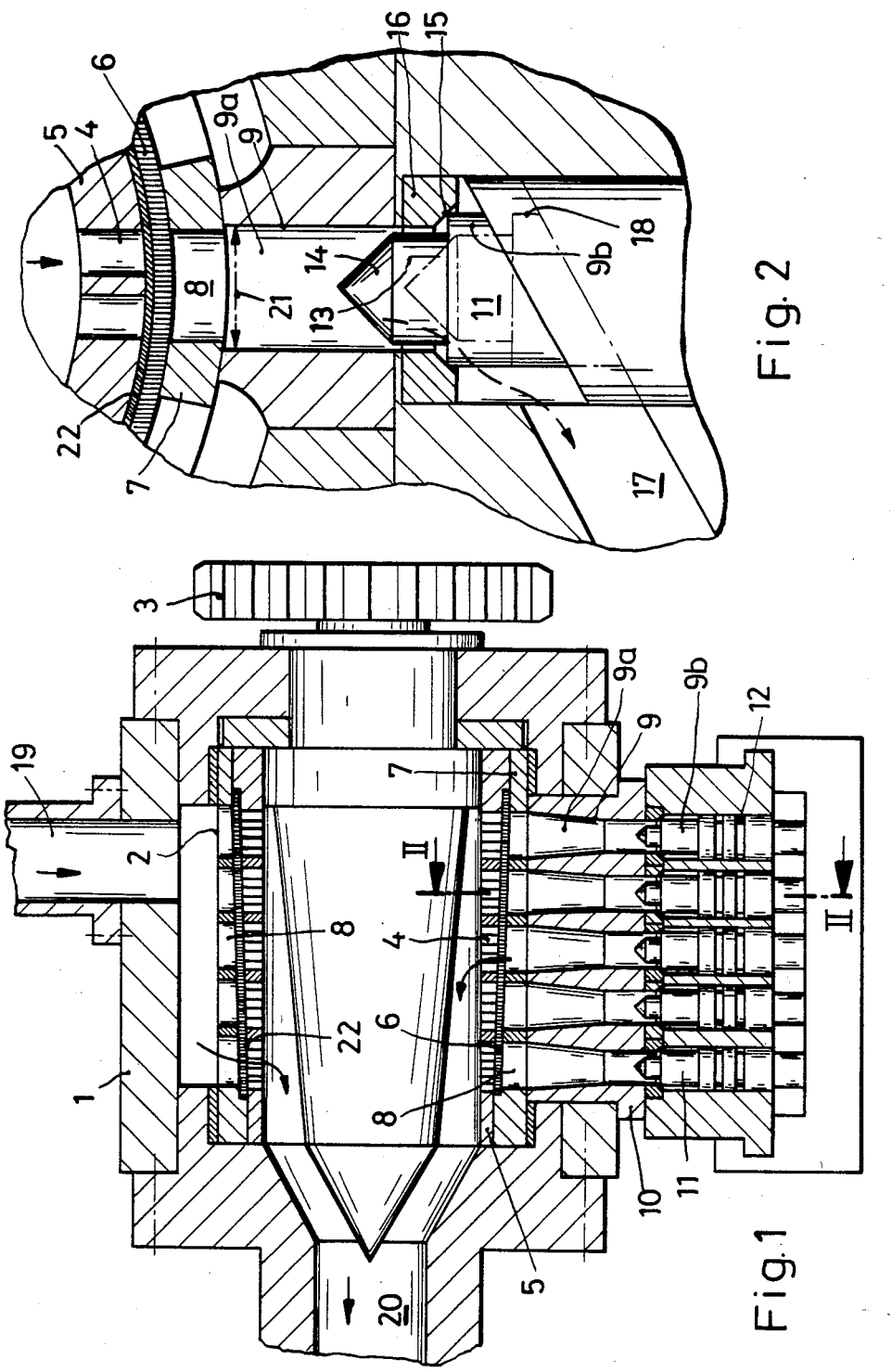

FILTERING DEVICE

FIELD OF THE INVENTION

The present invention relates to a filtering device for filtering solid particles from liquids. In this connection, the term "liquids" encompasses such materials as fused thermoplastics materials.

BACKGROUND OF THE INVENTION AND DISCUSSION OF PRIOR ART

A filtering device for such a purpose is disclosed in German Offenlegungsschrift No. 2 407 663 and comprises a hollow-cylindrical, rotating filter member. Around the periphery of the filter member, filtering bores are disposed in series above one another.

Back-rinsing bores are formed in a hollow-cylindrical housing which surrounds the rotatable sieve member. As the filter member rotates, the filtering bore moves into and out of alignment with the back-rinsing bores.

The back-rinsing bores are successively opened, as rotation of the filter member continues, by means of a rotatable, cylindrical valve. The valve has transverse bores formed therein and, when the transverse bores form a linear conduit with the respective back-rinsing bore, the valve opens.

There is a drop in pressure of from approximately 250 bars upstream of the filter member to approximately 180 bars within the filter member. Accordingly, the material in the interior of the hollow-cylindrical filter member forces the solid particles, which adhere to the external surface of the filter cylinder, back through the back-rinsing openings and the transverse bores in the cylindrical valve member. The solid particles can then be collected and discharged.

However, there are a number of reasons why such a filtering device has not proved successful in practice. Firstly, when the cylindrical valve member, provided with the transverse bores, is rotated so as to open the back-rinsing conduits, small solid particles can pass into the gap between the cylindrical valve member and the housing. After a very brief period of time, this infiltration of solid material makes it impossible to rotate the valve member. The back-rinsing openings cannot, therefore, be opened and no back-rinsing can be effected. It is necessary to dismantle the entire filtering device before it can be re-used.

Moreover, relatively large solid particles easily block the back-rinsing bores and/or the transverse bores in the cylindrical valve member. In particular, there is a danger that, as the cylindrical valve member continues to rotate, thin-layered solid particles may be drawn into the gap between the housing and valve member. This immediately causes the cylindrical valve member to become blocked.

However, the major disadvantage of such a device is that it has proved extremely difficult to produce a hollow-cylindrical fine filter sleeve with sufficient accuracy to ensure, when high pressure subsists upstream of the sieve member, unfiltered material is prevented from passing into the back-rinsing conduits through the intermediary walls of the receiving chambers formed in the sieve member.

If this disadvantage is not overcome, it is not possible for sufficient pressure to be built up in the interior of the hollow-cylindrical filter member. Such build-up of pressure in the interior of the sieve member is vitally important if back-rinsing and cleaning of the chambers is to be effected. Such chambers are as mentioned hereinbefore, formed in the external sleeve of the filter and accommodate the coarse or large particles.

If, due to leaks, a high pressure cannot be built up in the interior of the hollow-cylindrical filter member, back-rinsing is no longer ensured. Accordingly, the filtering device gradually becomes blocked and no longer functions.

OBJECTS OF THE INVENTION

The invention seeks to provide a continuously-operable filtering device which is generally of the above-mentioned type and a hollow-cylindrical, rotating filter member and back-rinsing openings, but which operates satisfactorily, without interruption, for a longer period of time than has hitherto been possible. In particular, the present invention seeks to provide a device in which the back-rinsing can be effected without problems arising and, in particular, a device in which the back-rinsing openings cannot become blocked with solid particles.

SUMMARY OF THE INVENTION

According to the present invention, there is provided a filtering device for filtering solids from liquid or liquid-like materials such as fused thermoplastic material comprising a fixed housing and a hollow-cylindrical, filter member rotatable in the housing, the filter member comprising an inner sleeve or drum member, a support filter disposed on the drum, a fine filter sleeve member and an outer sleeve, the external sleeve defining a plurality of chambers, the filter member having an outlet for the liquid or liquid-like material in one of its end regions, a plurality of back-rinsing conduits being provided in the housing and surrounding the filter member for receiving solid particles remaining in the chambers in the outer sleeve after filtration, the solid material being forced into the conduits by counter-pressure which is produced in the interior of the filter member by the material due to a pressure drop wherein the back-rinsing conduits are adapted to be closed by means of pistons which are axially slidably displaceable in the conduits, the filter member has a cylindrical external surface and support filter which is disposed in the filter member, and the fine filter sleeve member each taper conically inwardly in the direction of the discharge outlet for the filtered liquid material.

By providing a piston, which is slidably axially displaceable in each of the back-rinsing conduits and which, effectively closes and opens the conduits, it is almost impossible for the back-rinsing openings to be blocked with solid particles.

Because the internal surface of the external sleeve, the support filter and the fine filter sleeve taperconically inwardly in the direction of the outlet from the filter, compensation for any slight inaccuracies which might arise during manufacture of these three components is automatic. In other words, the fine filter sleeve abuts against the support filter and the internal surface of the external sleeve with virtually no clearance therebetween. This effectively prevents any leakages occuring between the fine filter sleeve and the support filter or between the fine filter and the external sleeve. An adequate back-pressure is therefore built-up by the already filtered material. The back-pressure only becomes effective when the pistons, which are disposed in the back-rinsing conduits, are retracted during their return stroke to open the back-rinsing conduits. Only one of the back-rinsing conduits is opened at any one time. This means that the pressure existing in the interior of the filter can be used solely for back-rinsing this particular conduit. Accordingly, solid particles are rinsed back very rapidly and at high pressure, and the particular filter member is thoroughly cleaned.

Preferably, a plurality of radial bores are provided in the drum of the filter member, the cross-section of each back-rinsing conduit being greater than that of the radial bores so that, in use, at least two selected bores are alignable simultaneously with a selected back-rinsing conduit.

By making the back-rinsing conduits of such a diameter that, in each case, a plurality of bores in the cylindrical filter member communicate therewith when the back-rinsing conduit is open, the back-pressure in the plurality of bores is used for back-rinsing and cleaning a relatively large area of the fine filter sleeve. The solid materials may be received in the solid receiving chambers associated with the back-rinsing conduits and may be removed therefrom from time to time. Because the back-rinsing conduits are divided into a solid-receiving chamber and a piston chamber, large solid particles are also easily detected and discharged, without causing any blockages in the device.

To prevent any blockages in the back-rinsing conduits, even if the solid components are large, for example, aluminum foil particles adhering to plastics material drinking cups or trays, of which the plastics material is to be regenerated and reused, it is desirable if the back-rinsing conduits each comprise a solids receiving chamber and a piston receiving chamber.

Preferably, the leading edges of the pistons are bevelled and co-operate sealingly with correspondingly bevelled thrust rings.

Advantageously, the bevelled leading edges of the piston and the correspondingly bevelled thrust rings are each formed of hardened metal. Further advantageously, the pistons each have a leading end face, an axially extending, integrally formed piston extension portion being provided on the end face, the extension portion comprising a cylindrical portion of reduced diameter, compared with that of the piston, adjacent the end face and a conically inwardly tapering portion extending co-axially with the cylindrical portion in a direction away from the end face of the piston, the tapering portion teminaing in an apex. By providing such an arrangement, when the back-rinsing conduit is closed, the free end of the piston, that is to say, the end of the piston nearer the filter member, forces the particles back into the solids receiving chamber to such an extent that the angular piston edges, which are disposed at a lower level, are pressed against the thrust rings in a sealing manner. Any remaining solid particles are cut by such action and, in consequence, the pistons cannot be blocked by solid particles coming between the pistons and the back-rinsing conduit wall. At the same time, this arrangement ensures that the seal produced prevents the melt from being discharged.

A discharge bore for the solids material is advantageously provided in the back-rinsing conduits, more specifically in the piston receiving chamber of the conduits, so that the back-rinsed solid particles can be dischaged from the filtering device.

BRIEF DESCRIPTION OF THE DRAWINGS

One embodiment of a filtering device in accordance with the present invention will be further described, by way of example, with reference to the accompanying drawings, in which:

FIG. 1 is a longitudinal sectional view through a filtering device in accordance with the present invention, and FIG. 2 is a sectional view taken along the line II—II of FIG. 1.

DESCRIPTION OF PREFERRED EMBODIMENT

In the drawings, there is shown a filtering device which comprises a housing 1 within which a hollow-cylindrical filter member 2 is rotatably mounted. The sieve member 2 is driven by means of a spur wheel 3. The filter member 2 comprises four main components. These are an external sleeve member 7 in which chambers 8 are defined for receiving the material to be filtered, a central fine screen filter 6 in the form of a sleeve, a support screen 22 for the filter 6 and an internal sleeve member 5 having a plurality of narrow through-bores 4 formed therein.

A supply conduit 19, for supplying the material to be filtered to the filter member 2, extends through the housing 1 so that the material is fed to the filter member 2 in a substantially radial manner. Substantially diametrically opposite the conduit 19, with respect to the filter member 2, are a plurality of back-rinsing conduits 9 which are located in a housing 10. The back-rinsing conduits 9 also extend substantially radially with respect to the member 2. The back-rinsing conduits 9 each comprise of a solid-material receiving chamber 9a and a piston receiving chamber 9b. Pistons 11, having piston rings 12 disposed thereon to act as sealing means, are slidably displaceable mounted in the piston receiving chambers 9b of the conduits 9.

The free end portion of each piston 11 comprises a cylindrical portion 13 and a conically inwardly tapering apex portion 14, the inward taper being in direction towards the filter member 2.

The cylindrical portion 13 of each piston is provided with sharp, hardened leading edge portion 15 which, at the end of the forward stroke of the piston, bears against a hardened thrust ring 16. During the rearward stroke of the piston 11, a discharge conduit 17 is uncovered. This rearward position of the piston is indicated by the dash-dot line 18 in FIG. 2.

The method of use of the filtering device of the present invention will now be described. A thermoplastics material, which is mixed with solid particles such as pieces of aluminum foil, is to be comminuted and recovered. The mixture is first treated in an extruder (not shown) which is disposed upstream of the filtering device. This causes fusion of the thermosplastics material. The mixture of aluminium foil and fused thermoplastics material is then fed into the filtering device through the supply conduit 19. The material enters the chambers 8 in the rotating filter member.

The fused thermoplastics material flows through the filter screen 6, the support screen 22 and the bores 4 into the hollow interior of the filter member 2 and thence axially along the member to an outlet conduit 20 from the member 2. The outlet conduit 20 leads to a granulation device (not shown). The aluminium foil cannot, however, pass through the screens 6 and 22 and therefore remains in the chambers 8.

Due to the rotation of the filter member 2, the chambers 8 pass, during each revolution, in front of the inlets to the back-rinsing conduits 9. The conduits 9 are disposed in series either beneath or adjacent one another.

During a forward stroke of the piston, any thermoplastics material mixed with the aluminum foil will be returned to the interior of the filter member 2. The aluminium foil, however, is forced out of the chambers 8 into the conduits 9 and is sheared between the hardened edge portions 15 of the piston 11 and the hardened thrust ring 16. The pressure in the interior of the filter member 2 will cause the transfer of the foil into the chamber 8. As the piston is retracted, the foil passes into the discharge conduit 17 and is removed.

The internal sleeve 5 of the filter member, the support sieve 22, the fine filter sleeve 6 and the external sleeve 7 all taper conically inwardly in a direction towards the thermoplastics material outlet 20. The filter member 2 itself has a cylindrical external surface. By so doing, the member 2 is easily rotated so as to cause the chambers 8 to be aligned with the inlets of the back-rinsing conduits 9 without the possibility of the filter member tilting about its axis.

The conically tapering arrangement of the supporting filter 22 and the fine filter sleeve 6 means that it is a simple task to detach the fine filter sleeve 6 from the support sieve 22. This is of importance because the sleeve 6 needs to be replaced from time to time.

In particular, it is possible for the melt flow to exert slight pressure upon the fine filter sleeve 6 in the direction of the melt flow. This ensures that the fine filter sleeve 6 abuts against the support sieve 22 with virtually no clearance therebetween. As a result of this, leakages between the fine filter sleeve 6 and the support filter 22, which causes pressure losses, are effectively prevented.

We claim:

1. A filtering device for filtering solids from liquid or liquid-like materials such as fused thermoplastic materials, said device comprising fixed housing means, said housing means having an internal surface, said internal surface defining a cylindrical chamber in said housing means and a filter member rotatable in said cylindrical chamber, said filter member comprising
    (a) external sleeve means comprising an external wall, said external wall being located adjacent said internal surface of said housing, said external wall being cylindrical so as to be in conformity with said internal wall of said housing, said external sleeve means further comprising an internal wall surface, said sleeve means defining throughbores extending from said external surface to said internal surface,
    (b) fine filter sleeve means disposed adjacent said internal wall surface of said external sleeve means, said fine filter sleeve means including an internal surface,
    (c) support filter sleeve means disposed adjacent and supporting said internal surface of said fine filter sleeve means, said support filter sleeve means including an internal surface, and
    (d) internal sleeve or drum means disposed adjacent said internal surface of said support filter sleeve means, said internal sleeve or drum means including an internal surface, said internal surface defining a cavity, said internal sleeve or drum means defining a plurality of throughbores extending from adjacent said internal surface of said support filter sleeve means to said internal surface of said internal sleeve or drum, each said throughbore in said internal sleeve or drum means, being aligned with at least one said throughbore in said external sleeve means,
    said cavity defined by said internal surface of said internal sleeve or drum having a longitudinal axis and a first axial end region, and discharge means disposed in said first axial end region about said longitudinal axis, said fine filter sleeve means and said support filter each tapering conically inwardly in a direction towards said first axial end region, and
    said housing defining a plurality of conduits, each said conduit terminating at said internal surface of said housing and communicating with said cylindrical chamber, a piston disposed in each said conduit, said piston being axially slidably displaceable in said conduit between first and second end positions, said piston and said conduit associated therewith including co-operating sealing means whereby, in said first end position, said sealing means closes said conduit.

2. A filtering device as recited in claim 1, wherein said throughbores in said internal sleeve or drum means and said conduits defined by said housing are so dimensioned that at least two said throughbores are alignable simultaneously with each said conduit.

3. A filtering device as recited in claim 1 wherein each said conduit comprises first chamber means extending from said internal surface of said housing and second chamber means communicating with said first chamber means, said piston being slidably axially displaceable in said second chamber means.

4. A filtering device as recited in claim 1 wherein each said piston includes a leading edge, said leading edge defining a leading end face, said leading edge being bevelled, and wherein said housing includes thrust rings projecting into said conduits, said thrust rings being bevelled correspondingly with said bevelled leading edges of said pistons, said co-operative sealing being produced by sliding axial displacement of said piston to cause said bevelled edges of said pistons to abut said bevelling on said thrust rings.

5. A filtering device as recited in claim 4, wherein said bevelled leading edges of said pistons and said bevelled thrust rings are each formed of hardened metal.

6. A filtering device as recited in claim 4, additionally comprising piston extension portion means integrally formed on said leading end face of said piston, said extension portion means comprising a cylindrical portion, said cylindrical portion being of reduced diameter relative to said end face and extending forwardly away from said end face, said extension portion means additionally comprising a conical, inwardly-tapering portion extending forwardly away from said cylindrical portion, said conical inwardly-tapering portion terminating at an apex.

7. A filtering device as recited in claim 1 wherein said housing further defines a plurality of discharge conduits, each said discharge conduit being communicateable with a selected one of said conduits terminating at said internal surface of said housing.

* * * * *